United States Patent [19]

Davis

[11] Patent Number: 5,010,535

[45] Date of Patent: Apr. 23, 1991

[54] APPARATUS AND PROCESS FOR MEASURING DATA DISK RUNOUT AND ACCELERATION PARAMETERS

[75] Inventor: Mark L. Davis, Loveland, Colo.

[73] Assignee: Hewlett-Packard Company, Palo Alto, Calif.

[21] Appl. No.: 299,361

[22] Filed: Jan. 19, 1989

[51] Int. Cl.$^5$ ............................ G11B 17/00; G11B 21/10
[52] U.S. Cl. .................................. 369/32; 369/44.25; 369/44.32; 360/77.02; 360/78.09
[58] Field of Search ................. 360/75, 77.02–77.08, 360/31, 78.09; 369/32, 43, 44.25, 44.32, 44.34–44.36, 44.29, 53, 54, 58, 33

[56] References Cited

U.S. PATENT DOCUMENTS 4,745,588 5/1988 Yoshikawa et al. .................. 369/32
4,782,474 11/1988 Arai et al. ........................ 369/44.34

OTHER PUBLICATIONS

Integrated Electronics: Analog and Digital Circuits and Systems, Millman et al., McGraw-Hill, 1972, p. 552.

Primary Examiner—Aristotelis M. Psitos
Assistant Examiner—Steven R. Garland

[57] ABSTRACT

Runout and acceleration measurements are provided for a disk drive type device using a closed loop actuator to position a transducer element relative to circular and/or spiral tracks on a recording media. The transfer function of the actuator is determined and employed to construct a low pass filter network simulating that transfer function. The servo error signal is processed by the network with the output thereof corresponding to the runout either radially if the radial position servo error signal is processed or axially if the axial position servo error signal is used. Obtaining of the second derivative of the runout signal reflects the measure of acceleration associated with the thus determined runout.

11 Claims, 2 Drawing Sheets

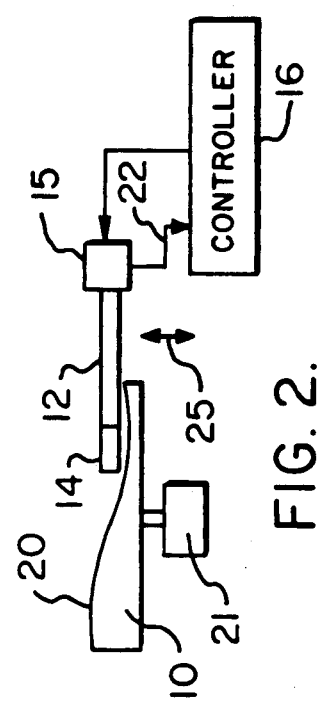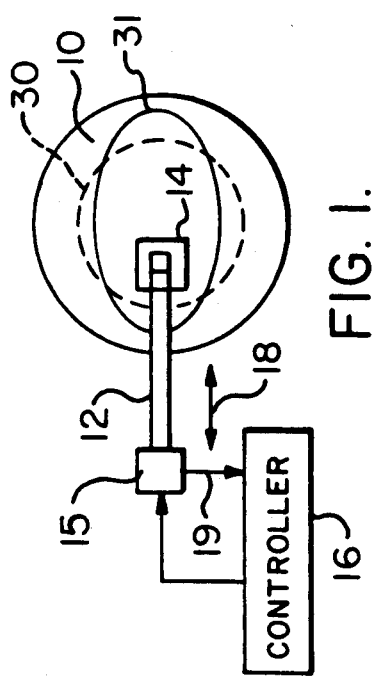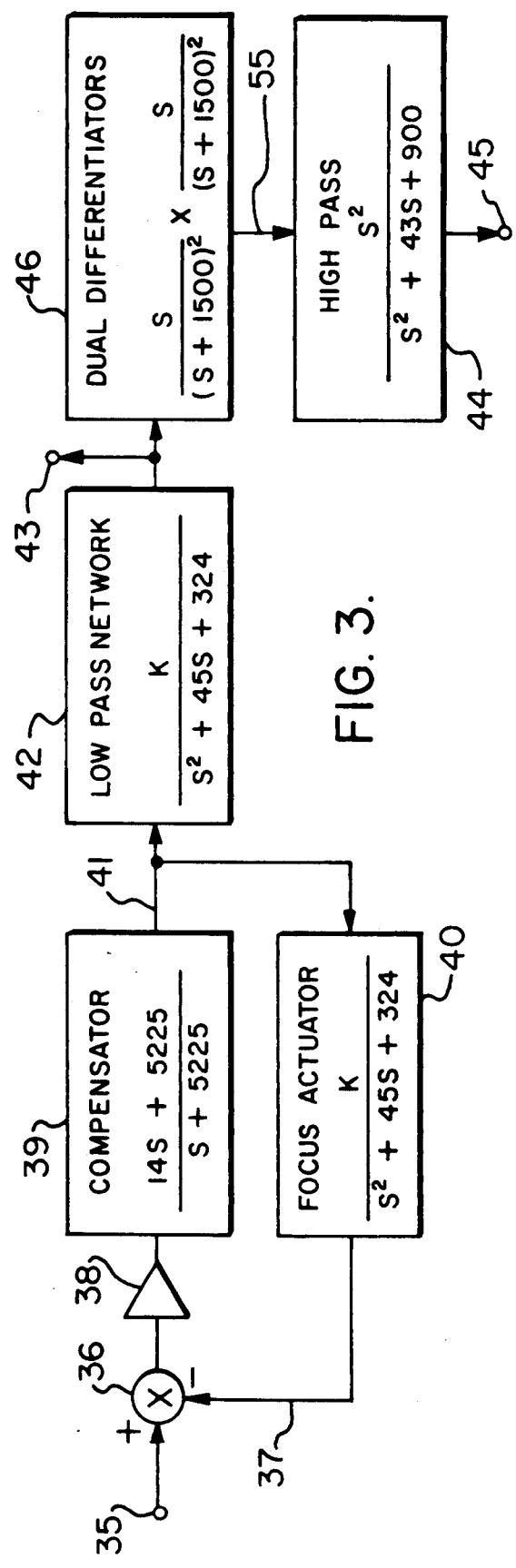

APPARATUS AND PROCESS FOR MEASURING DATA DISK RUNOUT AND ACCELERATION PARAMETERS

TECHNICAL FIELD

The present invention relates to data storage disks which are rotated in proximity to information exchanging transducers and the like wherein the disks are constructed of magnetic, optic or other materials. More particularly, the present invention relates to rotatable disks which retain digital data in tracks generally circular or spiral in configuration which are interfaced with transducer components moved in a radial and/or axial direction with respect to the data tracks on the disk. While not necessarily limited thereto, the present invention is particularly useful in conjunction with optical data storage disks.

BACKGROUND OF THE INVENTION

Data storing disks employ circular or spiral tracks on which the data is recorded. Transducers such as magnetic read/write heads, laser read/write assemblies, and the like must maintain registry with those tracks within relatively close tolerances.

The ideal data storage disk contains a plurality of concentric data tracks that are perfectly circular or spiral in character when established and remain that way indefinitely. Such ideal data tracks are rarely created in disk manufacture and even more rarely remain circular in the contemporary operating environment.

The lack of circularity in the data tracks is known in the industry as runout. If it is too great, the transducer controlling servo system may not have adequate reacting capability to respond so as to maintain data interfacing registry. Further, even though the disk itself might rotate at a constant velocity, the runout forces the servo system to accelerate and decelerate to compensate for the runout and prevent data loss. Thus it is important to determine whether the tracks on the disks are within minimum acceptable tolerances.

In the past, expensive, special purpose equipment was needed to perform the measurement of track runout. It was employed completely independent of the apparatus which interfaces with the disks. For optical disks, such measurements are even more difficult to perform since the tolerances are frequently set in microns. Thus the tolerances of actuator misalignment are likewise measured in microns. The optic disk measurement is currently done by special purpose structures including laser sources, charge coupled detectors, and the like along with appropriate sensors and supporting electronics and hardware, all separate from the disk drive and its electronics.

SUMMARY OF THE INVENTION

Contemporary disk drive systems utilize servo loop systems to compare signals correlated to desired positioning of transducers by actuator mechanisms. These systems introduce a combination of the reference position signal with a signal reflecting the actual transducer position to develop an error signal to drive the actuator.

By the present invention, the actuator transfer function is modelled in a low pass filter network and the actuator drive signal is coupled thereto so that the output of the low pass network is a measure of the disk runout. By using separate such networks for handling the radial and axial servo loop drive signals, two outputs are produced, one a measure of the radial runout and the other a measure of the axial runout. Thus this invention not only makes it possible to determine the runout and acceleration characteristics of a data storage disk as a low cost and accurate quality control tool, but it also allows the runout information to become available to control electronics or the like on a dynamic basis as the disk drive is in normal operating use.

The circuit implementation of this invention relates to a closed loop servo including an actuator which responds to a signal at its input for controlling the data transducer to disk media track relationship. The input signal is produced as an error signal by comparing a signal corresponding to the desired transducer to track relation with a feedback signal from the actuator reflecting the actual transducer position. The error signal may receive other processing such as amplification and oscillation preventing compensation before it is introduced to the actuator input.

The thus processed error signal is likewise introduced to a low pass network that is configured to electrically simulate the transfer function of the actuator. As a result, its output is a signal reflecting the runout in the direction the actuator is moving its transducer.

A high pass network can then operate on the actuator simulator network output to produce a runout signal that achieves a predetermined specification bandwidth. This latter network functions as a gain stage to provide a better quality axial runout signal.

An active network can provide simulation of the actuator transfer function such as by employing an operational amplifier with appropriate components and feedback circuits and connections. Calibration of the runout measurements is obtainable by correlating the active network output with a standard. One way of accomplishing this is to adjust the gain control of an amplifier stage associated with the output of the simulator.

The second derivative of the runout measurement signals correspond to the measure of acceleration associated with that runout. For example, by passing the axial runout signal through dual, serially coupled differentiator circuits, the result is the second derivative of runout which reflects acceleration in the same orientation as the runout (ie: axial or radial). Calibration of the acceleration measurements is obtainable by controlling the magnitude of the axial runout signal introduced to the differentiators.

Those having normal skill in the art will recognize the foregoing and other objects, features, advantages and applications of the present invention from the following more detailed description of the preferred embodiments as illustrated in the accompanying drawings.

BRIEF DESCRIPTION OF THE DRAWINGS

FIG. 1 is a top, partially schematic view of disk drive elements interfacing with a hypothetical data track on a circular disk.

FIG. 2 is a side view of the FIG. 1 apparatus.

FIG. 3 is a block diagram including one example of the mathematical transfer functions associated with the elements of this invention.

DETAILED DESCRIPTION OF THE PREFERRED EMBODIMENT

Figure 4:
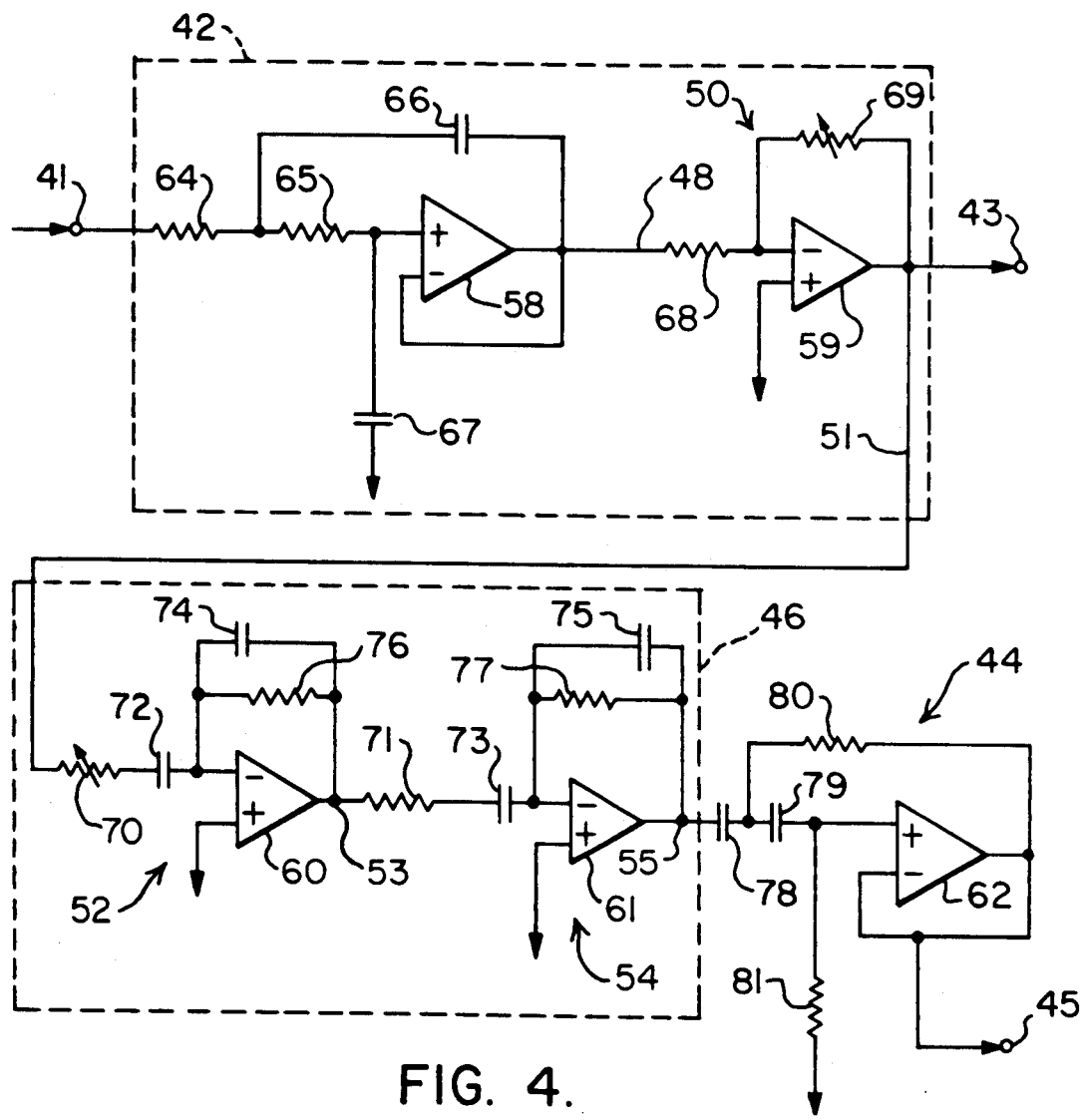
FIG. 4 is a block diagram of the electronic components for implementing the FIG. 3 example.

A data storage system in its normal operating environment is shown in FIG. 1 using a circular media 10 which is typically constructed of optic or magnetic material. In operation, a data transmitter/receiver element such as a magnetic transducer element or an optic reading/recording element is roughly positioned over disk 10 such as by movable arm 12 with the precise position of the element established by positioning head 14. As is conventional, a drive assembly 15 receives feedback signals from positioning head 14 so as to cause positioning head 14 and arm 12 to position radially as indicated by double headed arrow 18. The drive assembly 15 can also interface with other machine components such as controller 16 as is known in the art.

FIG. 2 is a side view of the FIG. 1 apparatus and shows the upper surface 20 of disk 10 grossly distorted for purposes of illustrating the function of the FIG. 2 components. The positioning head 14 is controlled by drive assembly 15 to maintain a relatively constant axial position over surface 20 through positioning head 14. That is, drive assembly 15 receives feedback information from positioning head 14 to appropriately position head 14 in an axial direction as indicated by double headed arrow 25.

For both axial and radial positioning of positioning head 14, drive assembly 15 typically employs a closed loop servo system. These are sometimes known as focus and/or tracking servo loops. The focus servos keep the spot in focus by positioning in the axial (25) direction whereas the tracking servo loop thereof moves the positioning head 14 for alignment with the track radially (18). Drive assembly 15 responds to reference signals reflecting a desired physical positioning of positioning head 14 with respect to disk 10.

Data storing disk 10 is intended to contain a plurality of circular or spiral tracks for retaining information and supporting data interchanges with the transducer associated with positioning head 14. Ideally these tracks are perfectly circular or spiral such as track 30 shown dotted in FIG. 1. Unfortunately, the tracks in the real world usually assume an offset radial relationship as suggested by track 31 which is depicted in a somewhat exaggerated orientation for purposes of illustration. Further, the warped relationship of the upper surface 20 associated with the data track causes a certain amount of axial displacement as disk 10 is rotated by drive motor 21.

In optical disks which employ prestamped grooves, radial runout is the measure of non-linearity of the grooves radially. Axial runout is the variations of recording layers which are between those grooves. It is important to determine if the disk 10 meets the specifications for accurate data storage and interchanges. Axial and radial runouts and accelerations are among the critical parameters for optical disks. Measurement of these parameters in the past was typically done using a mechanical and/or special purpose device separate from other electrical testers.

The variations from perfection caused by the two aforementioned imperfections are referred to as radial runout and axial runout, respectively, whereas the second derivative of radial and axial runouts are referred to as radial and axial acceleration and/or deceleration, respectively. For high speed and high density disk storage and especially for optical disk recording, the magnitude of the runout dimensions is minuscule (in the order of microns) but significant for accurate data recording and recovery. The present invention makes it possible to electronically measure these runout and/or acceleration parameters without special mechanical structures as required in the prior art.

FIG. 3 is a diagram which might typically represent the focus servo loop for implementation in an optical disk tester in accordance with the present invention. Implementation of this invention in conjunction with the tracking servo loop of an optical disk drive would have a similar configuration.

The purpose of the focus servo loop is to maintain the spot on the disk surface in focus despite axial runout of the tracks. Input 35 to summing circuit 36 is a reference signal reflecting the desired media position. That is, input 35 is a reference position which is the axial (or radial when the tracking servo is used) position of the recording layer. This is compared against the spot position using one of a variety of methods in summing circuit 36. The resulting error signal is amplified by amplifier 38, phase compensated by circuit 39, and transferred into an axial/radial spot position using the mechanical transfer function of focus actuator 40. Within the closed loop bandwidth of the servo loop, the spot position 37 will also equal the axial runout.

The mechanical elements that make up focus actuator 40 when it is implemented for an optical disk drive typically includes an objective lens, a coil to position the objective lens and a suitable mechanical mounting. The mechanical transfer function of actuator 40 is derivable using standard methods, given frequency and phase plots for a given actuator. Such data is generally specified or measured. Once the mechanical transfer function of actuator 40 is determined, it is simulated with electrical network 42. By using the same input for both actuator 40 and simulator 42, simulator output 43 corresponds to spot position although in dimensions of voltage rather than meters. Output 43 is relatively easy to measure and convert to a runout dimension as by table look-up, logical conversion, or the like. Further, output 43 is available for constructing a plot of the characteristics of the particular disk under consideration.

Acceleration is the second derivative of runout, and is preferably filtered appropriately per ANSI specifications (30–1500 Hz). To implement the acceleration signal from the runout signal, dual differentiators 46, bandlimited to 1500 Hz, are connected in series with a final 30 Hz high pass filter stage 44. This is discussed in greater detail below in regard to FIG. 4. It is preferable to specify the servo bandwidth as this does effect how well the spot position 37 will track the media position 35.

Spot position feedback input 37 to summer 36 should track media position input 35 whenever track registry is accomplished and there is no significant track runout. As is known in the art, the focus servo loop includes a operational amplifier 38 as is conventional along with a serially coupled compensator circuit 39. Compensator circuit 39 is designed to maintain the loop stable with enough phase margin so that it will not oscillate; it acts as a phase shifter to add phase margin around the gain crossover point.

The two inputs 35 and 37 to summing circuit 36 normally track one another. Thus the deviation in actuator 40 position represents axial runout within the closed loop bandwidth of the focus servo loop. Since this point is not available to measure, it is reconstructed in accordance with the present invention by low pass network 42 which electrically duplicates the transfer function of focus actuator 40.

The transfer function of a particular element or component is the measure of its output for a given input. As is known in the art, the mechanical transfer function is determinable based upon performance specifications and is mathematically expressible. It further is possible to electrically simulate that transfer function expression. This is illustrated for one particular example by the specific LaPlace transform equations shown for each of the FIG. 3 network blocks and especially actuator 40 and low pass network 42. The specific equations in the blocks of FIG. 3 relate to the focus servo of an optical disk drive.

Assuming a closed loop bandwidth of approximately 1500 Hz, inclusion of network 44 as a 30 Hz high pass filter allows achievement of the ANSI specification for accelerations of 30 to 1500 Hz. That is, ANSI specifications require no measurement for constant acceleration and therefore specify a cutoff at 30 Hz. and below. This is obtained in FIG. 3 (and FIG. 4) by a high pass filter 44. It is thus possible to graph frequency response against axial runout for the output 43 and axial acceleration for the output 45. Axial acceleration is, by definition, the second derivative of the axial runout and is limited to the proper 30–1500 Hz bandwidth by an appropriate bandpass filter 44.

While the exemplary preferred embodiment is described in conjunction with axial servo control, radial runout and radial acceleration are measurable with similar circuits and processes. For axial measurements in conjunction with a tracking servo loop, the FIG. 3 equations are similar but with differing values to accommodate the different transfer function of the tracking actuator while the circuit configuration for FIG. 4 is the same but again with appropriate specific component values. By including a parallel system along the lines of FIGS. 3 and 4 but operative in conjunction with the tracking servo, it is possible to concurrently produce signals reflecting both axial and radial runout and/or acceleration.

Circuitry for specific implementation of parts of the FIG. 3 system are shown in FIG. 4. Low pass filter 42 which provides the electrical simulation for the transfer function for focus actuator 40 received the same input 41 as actuator 40 and produces an output signal 43 with a frequency correlated to the axial runout. The FIG. 4 circuit additionally includes components to produce an axial acceleration at output 45.

FIG. 4 is a schematic for implementation of the axial runout and axial acceleration signal generation, given the input 41 to the focus actuator 40. As mentioned, the implementation for the radial runout and radial acceleration signals is practically identical but utilizing the input to the tracking actuator. The difference is that the tracking actuator has a slightly different transfer function, so the circuit to simulate the radial parameters will have slightly different component values.

In the FIG. 4 configuration, the output 48 of simulator 42 passes through a gain stage 50 for calibration and signal quality improvement with output 51 thereof coupled to the dual differentiator 46 which includes serial differentiator stages 52 and 54 to generate the second derivative of the axial runout signal present at 43 so that output 55 is the axial acceleration equivalent. Thus outputs 43 and 45 reflect the runout and acceleration of the particular track under consideration. Recording of those signals for a plurality of tracks will reconstruct the characteristics of the entire disk. Those output signals are useable for other purposes as well such as for data correction, etc. Continuing the example of FIG. 3, differentiators 52 and 54 include 1500 Hz low pass filters to adhere to ANSI specifications whereas circuit 44 is a 30 Hz high pass filter to further adhere to ANSI specifications for acceleration measurement.

There are several ways to calibrate the system for correlating the outputs 43 and 45 to particular runout and acceleration measurements. For instance, standard disks with known runout measurements are available. Variable resistor 69 in the amplifier stage 50 allows adjustment of the gain of that stage so that runout 43 reflects the known disk runout. By way of example, the user might adjust resistor 69 so that the output 43 is zero volts for zero runout. Thereafter, each 10 millivolts at output 43 could correlate to one micron of runout. The user can establish their own standard disk if the special purpose equipment to measure runout is available. In addition, measurement of the actuator constants likewise permits simulation of actuator signals to inject into the simulator 42 for calibration.

Acceleration measurement is calibrated by variable resistor 70 in the input connection to differentiator stage 52. Once the system input 41 and runout signal 43 are known, it is a simple matter to calculate the second derivative and set resistor 70 accordingly. The output 45 might correlate to acceleration on the basis of 100 millivolts/meter/sec.$^2$. Outputs 43 and 45 are both AC voltages.

The component values for constructing the circuits described above include LF356 differential amplifiers for elements 58–62. Resistors 64 and 65 providing a divider circuit for the input to amplifier 58 are each 24.9k ohms with a 0.27 uF feedback capacitor 66 and capacitor 67 rated at 0.44uF. Coupling resistor is 510 ohms and feedback resistor 69 for amplifier 59 is an adjustable 10k. Downstream coupling resistors 70 (variable) and 71 are each 470 ohms which cooperate with 0.22 uF capacitors 72 and 73. The feedback network for differential amplifiers 60 and 61 employ 10k resistors 76 and 77 in conjunction with 0.01 uF capacitors. The high pass filter amplifier 62 is configured with a network including 0.47 uF capacitors 78 and 79 along with a 16.2k feedback resistor 80 and an 8.06k resistor 81.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. In a device having a transducer element positioned by an actuator for exchanging data with tracks on a circular media wherein a closed loop servo system controls the actuator by producing a servo system error signal derived by comparing a reference signal defining a selected track related position for the transducer element with signals defining the actual position of the transducer element relative to the media, apparatus for producing an electrical signal corresponding to the physical displacement of data storing tracks on the circular media comprising a low pass filter network having an electrical transfer function to simulate the physical transfer function of the actuator, means coupling the servo system error signal to the input of said low pass filter, and output means receiving a signal resultant from passing said servo system error signal through said low pass filter network, said output means including means for producing a second derivative from said offset signal, wherein said signal at said output means reflects the amount of offset of the media track addressed by said reference signal.

2. Apparatus in accordance with claim 1 wherein said output means includes a first terminal for directly producing said offset signal as a measure of track runout, and wherein said second derivative producing means further includes a pair of serially coupled differentiator circuits for receiving said offset signal and generating an output signal that is the second derivative thereof, wherein said differentiator circuit output correlates to the acceleration measure associated with said runout.

3. Apparatus in accordance with claim 2 which includes a high pass filter network for improving the quality of the output signal from said low pass filter and said differentiator circuits.

4. In a disk drive for exchanging data with a media having circular data tracks through a transducer element which is positioned in proximity to the data tracks for interchanging data information therewith with the physical orientation of the transducer element controlled by a servo loop having a disk drive actuator responsive to an error signal produced by a comparator which compares a reference signal defining a selected transducer-to-track relationship with a signal reflecting an actual transducer position with respect to the track, apparatus for indicating the amount of offset of a selected track from ideal circularity comprising a low pass filter network including an amplifier and a feedback circuit for simulating a transfer function of the disk drive actuator, means coupling the error signal to an input of said low pass filter, amplifying means for receiving an output signal of said low pass filter to amplify said output signal, means for receiving an output of said amplifying means for indicating the runout of a track corresponding to the reference signal which established the error signal, and differentiator circuit means for receiving said amplifying means output and generating a second output signal corresponding to the derivative of said runout signal thereby providing a measure of the acceleration associated with said runout.

5. Apparatus in accordance with claim 4 which further includes a high pass filter for receiving the output of said differentiator circuit means for removing signals which approach DC from said second output signal.

6. Apparatus in accordance with claim 5 wherein said differentiator circuit means includes a pair of serially coupled differentiator circuits whereby the output signal thereof is the second derivative of the runout signal.

7. Apparatus in accordance with claim 4 which includes means for adjusting the gain of said amplifying means for calibrating said output thereof.

8. A process for producing an electrical signal corresponding to the physical displacement of data storing tracks on the circular media employed in a device having a transducer element positioned by an actuator for exchanging data with tracks on the circular media wherein a closed loop servo system controls the actuator by producing an error signal derived by comparing a reference signal defining a selected track related position for the transducer element with a signal defining the actual position of the transducer element relative to the media, comprising the steps of determining the transfer function of the device actuator, simulating said device actuator transfer function by an electrical network, passing the servo system error signal through said electrical network to produce an output therefrom, converting the signal resultant from passing said servo system error signal through said network into a measure of the amount of runout offset of the media track addressed by the reference signal, and obtaining the second derivative of the output of said electrical network for indicating the measure of acceleration associated with the runout offset of the media track addressed by the reference signal.

9. The process in accordance with claim 8 which includes the steps of utilizing a predetermined standard signal for said step of passing said servo system error signal through said electrical network to calibrate the results produced by said electrical network.

10. The process in accordance with claim 8 which includes the step of adjusting the amount of signal from said network employed by said second derivative obtaining step for calibrating the second derivative results against a standard signal.

11. In a disk drive for exchanging data with a media having circular data tracks through a transducer element which is positioned in proximity to the data tracks for interchanging data information therewith with the physical orientation of the transducer element controlled by a servo loop having a disk drive actuator responsive to an error signal produced by a comparator which compares a reference signal defining a selected transducer-to-track relationship with a signal reflecting an actual transducer position with respect to the track, apparatus for indicating the amount of offset of a selected track from ideal circularity comprising a low pass filter network including an amplifier and a feedback circuit for simulating a transfer function of the disk drive actuator, means coupling the error signal to an input of said low pass filter, amplifying means for receiving an output signal of said low pass filter to amplify said output signal, means for receiving an output of said amplifying means for indicating the runout of a track corresponding to the reference signal which established the error signal, and means for adjusting the gain of said amplifying means for calibrating said output thereof.

* * * * *